United States Patent [19]

Miller

[11] Patent Number: 5,523,547
[45] Date of Patent: Jun. 4, 1996

[54] SYSTEM FOR DIVERTING ELECTRIC CURRENT TO AN ELECTRICAL LOAD

[75] Inventor: John M. Miller, Saline, Mich.

[73] Assignee: Ford Motor Company, Dearborn, Mich.

[21] Appl. No.: 225,869

[22] Filed: Apr. 11, 1994

[51] Int. Cl.⁶ ........................................... H05B 1/02
[52] U.S. Cl. ........................ 219/202; 219/508; 219/483; 219/501; 307/10.7
[58] Field of Search ...................... 219/202–206, 219/497, 508, 509, 483, 485, 486, 481, 494, 501; 307/117, 10.1, 10.7; 323/272, 364

[56] References Cited

U.S. PATENT DOCUMENTS

| | | | |
|---|---|---|---|
| 4,084,126 | 4/1978 | Clements | 322/8 |
| 4,188,527 | 2/1980 | Follmer | 219/202 |
| 4,673,797 | 6/1987 | Weirick . | |
| 4,852,540 | 8/1989 | Safranek . | |
| 4,950,972 | 8/1990 | Berg . | |
| 4,985,670 | 1/1991 | Kaneyuki et al. . | |
| 4,992,672 | 2/1991 | Norton . | |
| 5,025,136 | 6/1991 | Doege et al. | 219/508 |
| 5,095,222 | 3/1992 | Pierret et al. | 219/203 |
| 5,146,744 | 9/1992 | Whittenberger . | |
| 5,166,538 | 11/1992 | Norton . | |
| 5,319,929 | 6/1994 | Cornelison et al. | 60/274 |
| 5,321,231 | 6/1994 | Schmalzriedt et al. | 219/497 |
| 5,325,038 | 6/1994 | Banzai et al. . | |
| 5,388,404 | 2/1995 | Tsumura | 219/202 |

Primary Examiner—Mark H. Paschall
Attorney, Agent, or Firm—Mark S. Sparschu; Roger L. May

[57] ABSTRACT

An electronic system for diverting current to a high-current load on an automobile, such as an electrically heated catalyst, is disclosed. In the system, the current of the high-current load is switched by electronic circuitry, rather than by an electromechanical relay. When current is no longer required by the high-current load, the electronic system allows current to flow to other loads on the automobile. The electronic system avoids the disadvantages presented by a relay's abrupt switching of the high currents involved.

13 Claims, 1 Drawing Sheet

SYSTEM FOR DIVERTING ELECTRIC CURRENT TO AN ELECTRICAL LOAD

BACKGROUND OF THE INVENTION

1. Field of the Invention

The present invention relates to an electronic system for diverting electric current to an electrical load.

2. Description of the Related Art

Catalytic converters are widely employed in automobiles to reduce emissions from automobile engines. One limitation of typical catalytic converters is that they perform optimally only when the catalysts within them are warm. Typically, several minutes of engine operation are needed for an engine's exhaust gases to warm the catalyst in a catalytic converter. As a result, catalysts will operate with reduced efficiency for those several minutes. With the ever-increasing requirements for lower automotive emissions, such reduced efficiency can be a detriment.

A catalyst which can dramatically reduce the period of operation with such reduced efficiency is an electrically-heated catalyst (EHC). In addition to their ability to be heated by exhaust gases, EHCs can be heated by passing electric current through them. As a result, EHCs can be warm much sooner than traditional catalysts.

One drawback of EHCs is that, although they heat quickly, they require a great deal of electrical current. The amount of current can be over 100 amperes and can thus approach the entire current-generating capacity of many automobile alternators. An EHC in combination with other electrical loads on a vehicle can easily outstrip the current-generating capacity of an alternator. Those other loads include high-current loads such as a 12-volt battery which is charged by the alternator, headlights and a rear window defroster grid.

Because of the excessive electric current demands which can be placed on an alternator by an EHC and other loads, a system which diverts essentially all of an alternator's current to the EHC for the time needed to heat the EHC will be advantageous. While the diversion is occurring, other loads on the vehicle would be powered from energy stored in the 12-volt battery. After the EHC is warm, the system would stop diverting current to the EHC. Current from the alternator would then flow instead to the 12-volt battery and the other electrical loads on the vehicle.

A means employed in the prior art to divert current to an intermittent high-current load (specifically an electrically-heated windshield) is a double-throw electromechanical relay. In one state, the relay is switched such that current can flow from the alternator to the intermittent load. In the other state, the relay is switched such that current can flow to the other loads on the vehicle. Although a relay as a diverter generally serves the intended purpose, its abrupt switching of the high currents involved can cause problems. Most significantly, the durability of the relay is compromised by the abrupt switching of the high currents.

Therefore, a system which can divert current to an intermittent high-current load without the use of an electromechanical relay will provide advantages over the prior art.

SUMMARY OF THE INVENTION

The present invention provides a system for diverting current to an electrical load. The system comprises an electrical energy source with an output and a first electrical load electrically connected to receive electric current from the electrical energy source. The system also includes at least one other electrical load. Further, the system comprises switching means connected in series with the first electrical load for controlling a current flow from the electrical energy source to the first electrical load. Also, the system comprises blocking means for blocking electrical current flow from the electrical energy source to the at least one other electrical load if a voltage at the output of the electrical energy source is not greater than a voltage of the at least one other electrical load by a predetermined amount.

The present invention also provides a second electronic system for diverting current to an electrical load. The system includes an electrical energy source with an output. Further, the system includes a first electrical load electrically connected to receive electric current from the electrical energy source. Also, the system includes at least one other electrical load. Additionally, the system contains first switching means for switching an electrical current. Further, the system contains second switching means responsively coupled to the first switching means and further coupled in series with the first electrical load for controlling a current flow from the electrical energy source to the first electrical load in response to the first switching means. Additionally, the system includes blocking means for blocking electrical current flow between the electrical energy source and the at least one other electrical load if a voltage at the output of the electrical energy source is not greater than a voltage of the at least one other electrical load by a predetermined amount.

The present invention allows current to be diverted as required to a high-current electrical load such as an electrically heated catalyst. When current diversion to the high-current electrical load is not required, current can be supplied to other loads. The present invention further allows such current diversion to be performed without the use of all electromechanical relay to switch the high currents involved.

DETAILED DESCRIPTION OF THE PREFERRED EMBODIMENT

Figure 1:
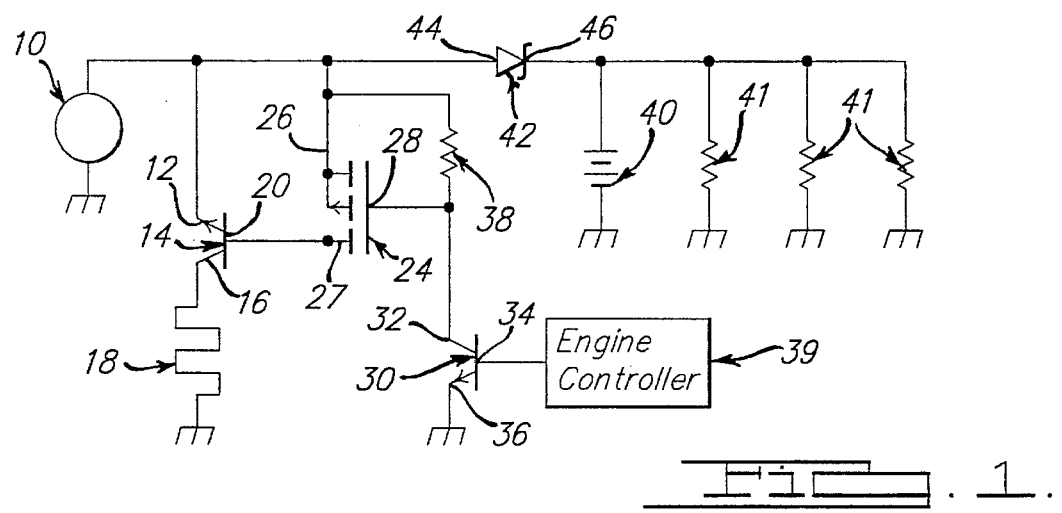
FIG. 1 is an electrical schematic of a system representing one embodiment of the present invention.

A first embodiment of an electronic system according to the present invention is illustrated in FIG. 1. An vehicle alternator 10 generates electrical energy at a nominal voltage of approximately 12 volts DC. Emitter 12 of first n-p-n bipolar junction transistor (BJT) 14 is connected to the output of alternator 10. Preferably, BJT 14 is the parallel combination of seven D44VH7 power transistors from General Electric Corporation. Collector 16 of BJT 14 is connected to one side of electrically-heated catalyst (EHC) 18. The other side of EHC 18 is connected to ground. Base 20 of BJT 14 is connected to source 22 of p-channel insulated-gate field-effect transistor (FET) 24. FET 24 is preferably one or more power MOSFETs such as the Si9407DY from Siliconix, connected in parallel as necessary to provide adequate base drive to BJT 14. Gate 28 of FET 24 is connected to collector 32 of a second n-p-n BJT 30. BJT 30 is preferably a common signal transistor such as a 2N2222 or equivalent. Gate 28 of FET 24 is also connected via resistor 38 to both drain 26 of FET 24 and the output of alternator 10.

Emitter 36 of BJT 30 is connected to ground. Base 34 of BJT 30 is disposed to receive an electrical command representing a desire for current to be provided to EHC 18. Preferably, base 34 is connected to an engine controller 39, which has responsibility for controlling emissions on the vehicle. As BJT 30 is configured in this embodiment of the present invention, a "high" level signal at base 34 will represent a command for current to be provided to EHC 18. On the other hand, a "low" level signal will represent that current is not to be provided to EHC 18. A diode 42 is connected between the output of alternator 10 and 12-volt battery 40 and other loads 41. 12-volt battery 40 is a standard component on almost all automobiles. Other loads 41 include a rear-window defroster grid, headlamps, and all other electrical loads on the vehicle. Preferably, diode 42 is a Schottky diode such as a 84CNQ045 from International Rectifier.

The system illustrated in FIG. 1 operates as follows. Alternator 10 generates electrical energy for a vehicle. Alternator 10 is the electrical energy source for all loads on the vehicle, including EHC 18, 12-volt battery 40 and other loads 41. As has previously been discussed, EHC 18 can draw over 100 amperes. As a result, the total demand for electrical current by EHC 18, 12-volt battery 40 and other loads 41 can easily outstrip the current-generating capacity of alternator 10. The present invention allows current to be diverted to EHC 18 for as long as needed, then provided to 12-volt battery 40 and other loads 41.

A command signal to cause current to be diverted to EHC 18 is provided at base 34 of BJT 30 by engine controller 39. If engine controller 39 wishes current to be diverted to EHC 18, engine controller 39 will provide a "high" signal at base 34. That signal causes BJT 30 to conduct, causing current flow into collector 32 and out of emitter 36 to ground. This current flow causes collector 32 to assume a "low" voltage of near zero volts.

When collector 32 assumes the low voltage just described, gate 28 of FET 24 also assumes this low voltage, being connected to collector 32. Because gate 28 has assumed a low voltage, FET 24 conducts. Thus, current flows into drain 26 and out of source 22. This current has only one path to take, namely into base 20 of BJT 14. As a result, BJT 14 conducts.

It should be noted that BJT 14 is configured in "inverted mode". When BJT 14 is supplied a large amount of base current while connected in inverted mode, current flows into emitter 12 and out of collector 16 with a very low voltage drop across the junction between emitter 12 and collector 16. The voltage drop can be on the order of 0.1 volt. The very low voltage drop is advantageous because of the high current which will flow through EHC 18 when BJT 14 conducts. The low voltage drop helps assure that a minimum of power is dissipated as the high current flows through the junction between emitter 12 and collector 16.

Diode 42 assures that current flows predominantly to EHC 18 and not to 12-volt battery 40 or other loads 41. Current will flow through diode 42 only if anode 44 is one diode drop higher in voltage than cathode 46. Therefore, current will flow to battery 40 and other loads 41 only to the extent that alternator 10 can generate all of the current drawn by EHC 18 and continue to maintain a voltage at least one diode drop higher than 12-volt battery 40. Thus, only excess current not required by EHC 18 goes to 12-volt battery 40 and other loads 41.

Thus, it can be seen that when engine controller 39 causes base 34 of BJT 30 to go high, all or almost all of the current generated by alternator 10 is diverted through EHC 18. Only excess current goes to 12-volt battery 40 and other loads 41.

When engine controller 39 no longer wishes current to flow through EHC 18 (i.e, when EHC 18 is warm), engine controller 39 will cause base 34 of BJT 30 to go "low". This turns off BJT 30. Collector 32 of BJT 30 and gate 28 of FET 24 then go "high". FET 24 therefore turns off, stopping current flow into base 20 of BJT 14. BJT 14 therefore turns off, stopping current flow to EHC 18. Now, assuming that alternator 10 is generating voltage at least one diode drop greater than the voltage of 12-volt battery 40 and other loads 41, all of alternator 10's current will flow to 12-volt battery 40 and other loads 41.

It should be noted that in FIG. 1, drain 26 of FET 24 can be connected to 12-volt battery 40 and other loads 41, rather than to the output of alternator 10. However, connecting the circuit in this fashion entails the possibility that when the entire system is turned off, current will leak from 12-volt battery 40 through BJT 30. In such an event, 12-volt battery 40 can inadvertently be run down, a disadvantageous situation in a vehicle.

Figure 2:
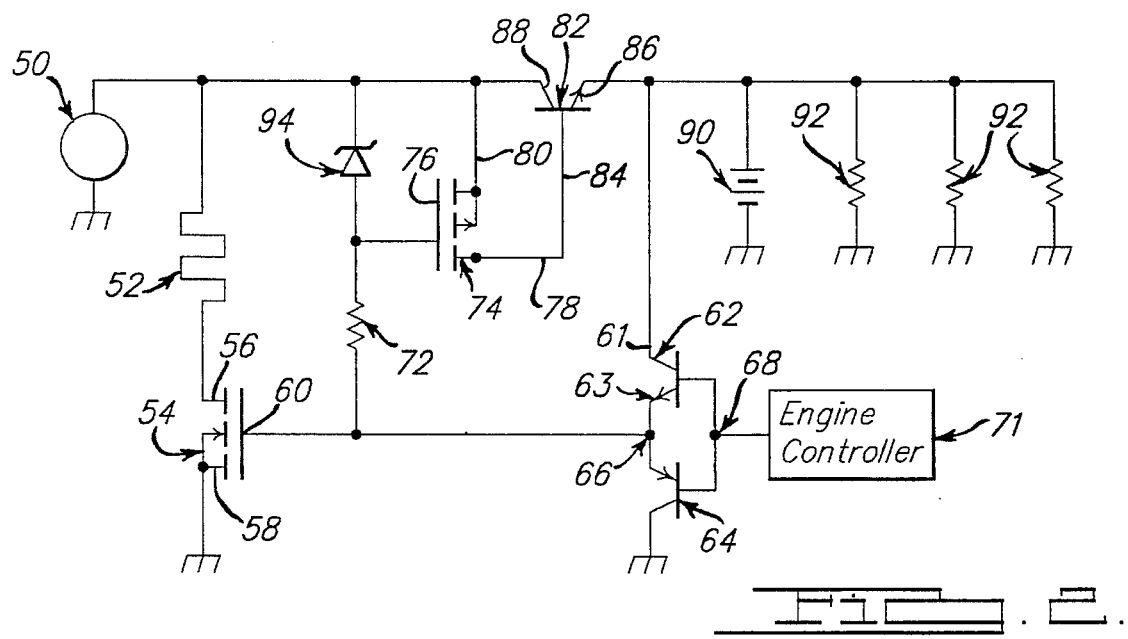
FIG. 2 is an electrical schematic of a system representing a second embodiment of the present invention.

A second embodiment of the present invention is illustrated in FIG. 2. Alternator 50 can be a device with a nominal 12 volt output or with an output which can range from 12 volts to a higher voltage such as 35 volts. One side of EHC 52 is connected to the output of alternator 50. Drain 56 of n-channel field-effect transistor (FET) 54 is connected to a second side of EHC 52. Source 58 of FET 54 is connected to ground. FET 54 is preferably a power MOSFET with a very low "on" resistance between drain 56 and source 58. Examples of such MOSFETs are high cell density MOSFETs (such as two Motorola MTP75N05HD MOSFETs connected in parallel) and so-called "trench-MOSFETs" (such as two Siliconix SMP60N06-08 MOSFETs connected in parallel).

Gate 60 of FET 54 is coupled to output 66 of a pair of bipolar junction transistors (BJTs) 62 and 64 configured in a push-pull configuration. Preferably, BJT 62 is a common n-p-n signal transistor such as a 2N2222 or equivalent. BJT 64 is preferably a common p-n-p signal transistor such as a 2N2907 or equivalent. Input 68 of the push-pull configuration is preferably connected to engine controller 71, which has responsibility for controlling emissions from the vehicle.

A resistor 72 couples output 66 of the push-pull configuration of BJTs 62 and 6.4 also with gate 76 of a p-channel field-effect transistor (FET) 74. Gate 76 is the input of a hybrid Darlington combination of FET 74 and an n-p-n bipolar junction transistor (BJT) 82. BJT 82 is preferably selected to be a power transistor with a very low collector-to-emitter voltage drop when BJT 82 is in saturation. For example, BJT 82 could be a parallel combination of seven D44VH7 power transistors from General Electric. Collector 88 of BJT 82 is connected to the output of alternator 50, while emitter 86 of BJT 82 is connected to electrical loads comprising 12-volt battery 90 and other loads 92. Source 80 of FET 74 is connected to the output of alternator 50 and drain 78 of FET 74 is connected to base 84 of BJT 82.

A Zener diode 94, preferably having a rating of 15 volts, is connected between the output of alternator 50 and gate 76 of FET 74. Zener diode 94 protects the Darlington combination of FET 74 and BJT 82 in the event that alternator 50 puts out a voltage above about 18 volts.

Operation of this embodiment of the present invention is as follows. Alternator 50 is the source for electrical power for EHC 52, 12-volt battery 90 and other loads 92. When engine controller 71 desires current to flow to EHC 52 instead of to 12-volt battery 90 and other loads 92, engine controller 71 causes a "high" signal to be generated at input 68 of the push-pull combination of BJTs 62 and 64. This causes BJT 62 to turn "on". Thus, a "high" voltage is applied to gate 60 of FET 54. FET 54 turns on, allowing current flow from alternator 50 through EHC 52. Because BJT 62 is on, a high voltage is also applied to gate 76 of FET 74. FET 74, being a p-channel FET, is thus off. Because FET 74 is off, BJT 82 is also off. As a result, alternator 50 is isolated from 12-volt battery 90 and other loads 92.

Therefore, it can be seen that when engine controller 71 supplies a high signal at input 68, current from alternator 50 is diverted to EHC 52. Furthermore, 12-volt battery 90 and other loads 92 are isolated from alternator 50.

Once EHC 52 is warm, engine controller 71 will force input 68 of the push-pull combination of BJTs 62 and 64 to go low. BJT 62 thus will stop conducting and BJT 64 will start conducting. BJT 64 will draw current through zener diode 94 and resistor 72. One consequence of BJT 64 conducting is that gate 60 of FET 54 will be at a low voltage. As a result, FET 54 will be off, and will therefore draw essentially no current through EHC 52. Another consequence of BJT 64 conducting is that the current drawn through Zener diode 94 will cause gate 76 of FET 74 to be at a substantially lower voltage than source 80. FET 74, being a p-channel device, will therefore turn on. This will provide base current for BJT 82, preferably enough to drive BJT 82 deeply into saturation. With BJT 82 deeply in saturation, current can flow from alternator 50 to 12-volt battery 90 and other loads 92 with little power dissipation across the junction between collector 88 and emitter 86 of BJT 82.

It can therefore be seen that when engine controller 71 causes input 68 of the push-pull combination of BJTs 62 and 64 to go low, current can flow from alternator 50 to 12-volt battery 90 and other loads 92. Furthermore, essentially no current flows through EHC 52.

It was noted that in this embodiment of the present invention, alternator 50 can be a device with a nominal 12-volt output or a device with an output which can range from 12 volts to a higher voltage, say 35 volts. The higher voltage can be invoked while diversion of current to EHC 52 occurs, for faster heating of EHC 52.

Figure 3:
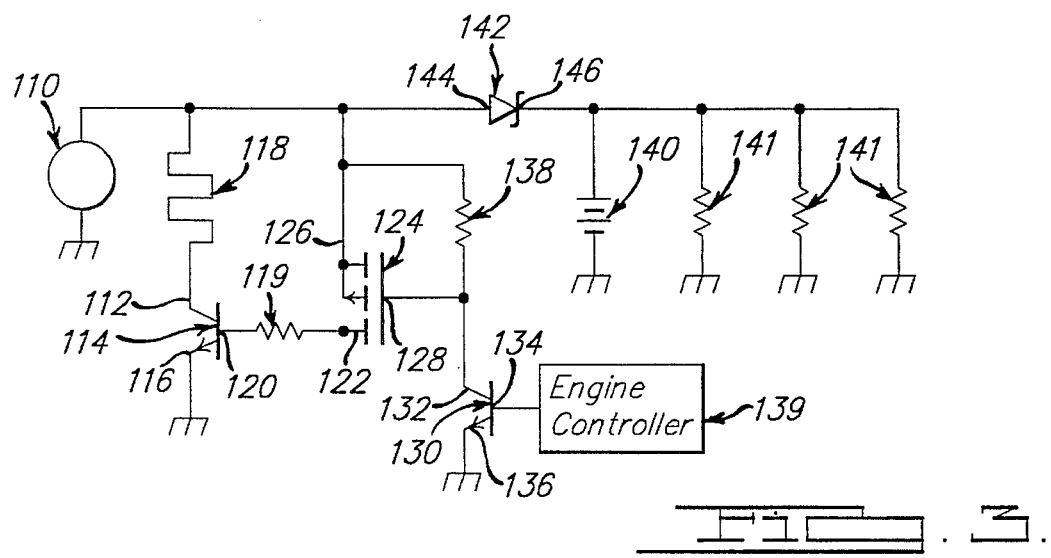
FIG. 3 is an electrical schematic of a system representing a variation of the embodiment of FIG. 1.

A third embodiment of the present invention is illustrated in FIG. 3. Here, one side of EHC 118 is connected to the output of a nominal 12-volt alternator 110. The other side of EHC 118 is connected to collector 112 of n-p-n bipolar junction transistor (BJT) 114. Preferably, BJT 114 is a parallel combination of seven D44VH7 power transistors from General Electric Corporation. Base 120 of BJT 114 is coupled via base resistor 119 to source 122 of p-channel field effect transistor (FET) 124. FET 124 is preferably one or more power MOSFETs such as the Si9407DY from Siliconix, connected in parallel as necessary to provide adequate base drive to BJT 114.

Drain 126 of FET 124 is connected to anode 144 of diode 142. Diode 142 is preferably a Schottky diode, such as the 84CNQ045 from International Rectifier. Cathode 146 of diode 142 is connected to 12-volt battery 140 and other loads 141. Drain 126 of FET 124 is further coupled via resistor 138 to gate 128 of FET 124 and to collector 132 of n-p-n bipolar junction transistor (BJT) 130. BJT 130 is preferably a common signal transistor such as a 2N2222 or equivalent. Base 134 of BJT 130 is connected to engine controller 139, which has responsibility for controlling emissions on the vehicle.

When engine controller 139 desires current to be diverted to EHC 118, engine controller 139 causes base 134 of BJT 130 to go "high". BJT 130 is thus turned on, further turning on FET 124 and BJT 114. Current therefore flows through EHC 118. Further, unless alternator 110 can supply all of EHC 118's current requirements and maintain a voltage at least one diode drop above the voltage of 12-volt battery 140, no current will flow from alternator 110 to 12-volt battery 140 and other loads 141. Thus, only excess current not required by EHC 118 is supplied to 12-volt battery 140 and other loads 141.

When engine controller 139 instead no longer requires current to be diverted to EHC 118, engine controller 139 causes base 134 of BJT 130 to go "low". BJT 130, FET 124, and BJT 114 are thus turned off. Current no longer flows through EHC 118, but instead through diode 142 to 12-volt battery 140 and other loads 141.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. An electronic system for diverting current to an electrical load, said system comprising:

an electrical energy source with an output;

a first electrical load electrically connected to receive electric current from said electrical energy source;

at least one other electrical load;

first switching means for switching an electric current;

second switching means responsively coupled to said first switching means and further connected in series with said first electrical load for controlling a current flow from said electrical energy source to said first electrical load in response to said first switching means; and blocking means for blocking electrical current flow between said electrical energy source and at said least one other electrical load if a voltage at said output of said electrical energy source is not greater than a voltage of said at least one other electrical load by a predetermined amount.

2. An electronic system as recited in claim 1 wherein said at least one other electrical load comprises a battery.

3. An electronic system as recited in claim 2 wherein said electrical energy source comprises an alternator.

4. An electronic system as recited in claim 3 wherein said second switching means comprises a first n-p-n bipolar junction transistor comprising an emitter, a base and a collector.

5. An electronic system as recited in claim 4 wherein said emitter is electrically coupled to said output of said alternator and said collector is electrically coupled to said first electrical load.

6. An electronic system as recited in claim 5 further comprising third switching means adapted to receive a command representing a desired switching of electrical current to said first electrical load, said third switching means operatively coupled to said first switching means.

7. An electronic system as recited in claim 6 wherein said blocking means comprises a diode with an anode electrically coupled to said output of said alternator and a cathode electrically coupled to said at least one other electrical load.

8. An electronic system as recited in claim 7 wherein said first electrical load comprises an electrically heated catalyst.

9. An electronic system as recited in claim 8 wherein said first switching means comprises a p-channel field-effect transistor comprising a gate, a drain and a source and wherein said source is electrically coupled to said base of said first n-p-n transistor and said drain is electrically coupled to said output of said alternator or to said at least one other electrical load.

10. An electronic system as recited in claim 9 wherein said third switching means comprises a second n-p-n bipolar junction transistor with a collector, said collector electrically coupled to said gate of said p-channel field-effect transistor.

11. An electronic system for diverting current to an electrical load, said system comprising:

an electrical energy source with an output;

a first electrical load electrically connected to receive electric current from said electrical energy source;

at least one other electrical load;

switching means connected in series with said first electrical load for controlling a current flow from said electrical energy source to said first electrical load; and blocking means for blocking electrical current flow from said electrical energy source to said at least one other electrical load if a voltage at said output of said electrical energy source is not greater than a voltage of said at least one other electrical load by a predetermined amount.

12. An electronic system as recited in claim 11 wherein said blocking means comprises a diode having an anode coupled to said output of said electrical energy source and a cathode coupled to said at least one other electrical load.

13. An electronic system as recited in claim 12 wherein said electrical energy source is an alternator and said at least one other electrical load includes a battery.

* * * * *